(12) United States Patent
Zavodny et al.

(10) Patent No.: US 11,566,902 B2
(45) Date of Patent: Jan. 31, 2023

(54) LOCALIZATION OF AUTONOMOUS VEHICLES VIA GROUND IMAGE RECOGNITION

(71) Applicant: Idealab, Pasadena, CA (US)

(72) Inventors: Maximilian Zavodny, Pasadena, CA (US); Erik Karl Antonsson, Pasadnea, CA (US); Bill Gross, Pasadena, CA (US); Mark Goodstein, South Pasadena, CA (US)

(73) Assignee: Idealab, Pasadena, CA (US)

( * ) Notice: Subject to any disclaimer, the term of this patent is extended or adjusted under 35 U.S.C. 154(b) by 618 days.

(21) Appl. No.: 16/151,200

(22) Filed: Oct. 3, 2018

(65) Prior Publication Data

US 2019/0107400 A1 Apr. 11, 2019

Related U.S. Application Data

(60) Provisional application No. 62/541,021, filed on Aug. 3, 2017.

(51) Int. Cl.
| | |
|---|---|
| *G01C 21/32* | (2006.01) |
| *B60W 40/06* | (2012.01) |
| *G06T 7/73* | (2017.01) |
| *G06F 16/29* | (2019.01) |

(52) U.S. Cl.
CPC ............. *G01C 21/32* (2013.01); *B60W 40/06* (2013.01); *G06F 16/29* (2019.01); *G06T 7/74* (2017.01); *G06T 2207/10021* (2013.01); *G06T 2207/30244* (2013.01); *G06T 2207/30252* (2013.01)

(58) Field of Classification Search
CPC .......... G01C 21/32; G06T 7/74; G06F 16/29; B60W 40/00
See application file for complete search history.

(56) References Cited

U.S. PATENT DOCUMENTS

| 10,901,432 B2* | 1/2021 | Sridhar ............... G05D 1/0278 |
|---|---|---|
| 2016/0167669 A1* | 6/2016 | Zhao ..................... G06V 20/56 |
| | | 382/195 |
| 2016/0292518 A1* | 10/2016 | Banitt .................. G06V 30/194 |
| 2020/0301382 A1 | 9/2020 | Fawaz et al. |
| 2022/0053993 A1 | 2/2022 | Woo |
| 2022/0092808 A1 | 3/2022 | Kwon |
| 2022/0095880 A1 | 3/2022 | Disch et al. |
| 2022/0095882 A1 | 3/2022 | Kara et al. |
| 2022/0095883 A1 | 3/2022 | Kara et al. |

(Continued)

*Primary Examiner* — Adam M Alharbi
(74) *Attorney, Agent, or Firm* — Knobbe, Martens, Olson & Bear LLP

(57) ABSTRACT

A system and method for localizing an autonomous vehicle using a digital stereo camera mounted to the autonomous vehicle and oriented to obtain images of the road surface. The system comprises an image processor configured to analyze the images of the road surface and identify micro-features, such as pores, holes, cracks, and granular material embedded in the street. The image processor is configured to compile previously obtained images of the road surface into reference mosaics and to compare the micro-features identified in newly obtained images to the reference mosaic to determine the location of the autonomous vehicle. The system may be further configured with a communications module to transmit images and localization information to a database repository or server.

14 Claims, 4 Drawing Sheets

(56) References Cited

U.S. PATENT DOCUMENTS

| | | |
|---|---|---|
| 2022/0095884 A1 | 3/2022 | Jekang et al. |
| 2022/0110502 A1 | 4/2022 | Dietrich et al. |
| 2022/0117459 A1 | 4/2022 | Wu et al. |
| 2022/0151454 A1 | 5/2022 | Boyer et al. |

* cited by examiner

LOCALIZATION OF AUTONOMOUS VEHICLES VIA GROUND IMAGE RECOGNITION

CROSS-REFERENCE TO RELATED APPLICATIONS

This application claims priority to and the benefit of U.S. Provisional Patent Application Ser. No. 62/541,021, filed Aug. 3, 2017, which is hereby incorporated herein by reference in its entirety.

FIELD OF ENDEAVOR

This disclosure relates generally to automated vehicle sensing systems, and in particular to a device and method for localizing a vehicle using image recognition of road surfaces using at least one camera.

BACKGROUND OF THE INVENTION

The determination of relative or absolute position is needed for many applications, particularly autonomous transportation vehicles and other mobile systems. Classic analog methods for ascertaining global position relied on accurate timekeeping and celestial navigation; maritime chronometers, for instance, could measure relative longitude by determining the difference between local noon (established with a sextant) and the time shown on the chronometer for a known line of longitude. Modern methods measure distance or the angle between an object and one or more known landmarks or locations. Global Positioning Systems (GPS), for example, determine an object's location by trilateration: calculating its distance from at least three satellites by measuring the time it takes a radio signal to propagate from each satellite to a receiver. Alternative conventional methods register sensor measurements against a map of previously measured values and recorded information. For example, the topography of terrain can be measured by stereogrammetric aerial photography and then drawn on a topographic map; observations or measurements of the terrain can then be used to locate or register an object's position with respect to the map. This process of determining an object's position in three-dimensional space is often referred to as "localization".

The position of an autonomous vehicle must be constantly reported and updated to facilitate navigation, improve adaptive routing, and ensure safe driving. GPS systems can demonstrate positional residual errors on the order of several meters, making them useful, but not sufficient, tools for real-time vehicle localization. Advances in object recognition and vision sensing technology have resulted in systems and methods which supplement global positioning data for a more accurate accounting of vehicle location during operation. Some of these solutions determine vehicle position by sensing the features in the environment through which the vehicle traverses.

Patterns or features which are suitable to enable image registration can be found by collecting image(s) of objects in the environment. Ideally, said features will have certain properties that make their identification robust, repeatable and unambiguous. Example properties of features for identification purposes include:

uniqueness among other nearby features so as not to cause ambiguity in associating a feature with its counterpart in a reference mosaic;

easily localizable, such that when features are detected in an image, their position within that image can be accurately determined, e.g. with subpixel accuracy;

invariance to the properties of the imaging device capturing the image, e.g. the features should be recognizable under varying conditions of camera distortion, resolution, exposure, color balance, perspective or hardware model;

invariance to changes in the environment, such as lighting and weather, e.g. fog, dew, frost, rain, and snow;

permanence, e.g. the feature is unlikely to be removed from the environment; and visibility, e.g. the feature is unlikely to be obscured in the future.

Geographic, man-made, or engineered features may contain suitable identifiable features exhibiting said exemplary properties. Examples of recognizable objects may include rocks, trees, utility poles and boxes, buildings, foundations, sidewalks, curbs, roadway markings, roadway shoulders, etc. In the absence of sufficiently recognizable features, in the presence of ephemeral surroundings, or to reduce the computational burden to a simpler feature set, image sensing technologies in use for autonomous locomotion may focus on recognizing features in the very road or surface over which the vehicle travels.

Wu et al. (Tao Wu and Ananth Ranganathan, *Vehicle Localization Using Road Markings*, IEEE Intelligent Vehicles Symposium IV, June 2013) demonstrated a means for localizing a vehicle using stereo cameras to take pictures of traffic signs painted on the road. Road markings and signs are surveyed ahead of time to associate GPS coordinates with the ground markers, and the images are processed to identify the markers and determine the pose, i.e. the combination of orientation and geo-spatial location of the vehicle.

Schreiber et al. (Markus Shreiber, Fabian Poggenhans and Christoph Stiller, *Detecting Symbols on Road Surface for Mapping and Localization using OCR*, IEEE Intelligent Transportation Systems, 2014, pp. 597-602) demonstrated a similar system to detect and identify road symbols using monoscopic or stereoscopic cameras using optical character recognition of images taken of the ground.

Since the 1970s, municipal and construction authorities have utilized systems to monitor road surface conditions. Technologies including lasers and ultrasound are used to map street surface roughness, identify fissures, cracks and potholes, and to detect asphalt raveling. US Patent Publication 2013/0076871A1 (Inventor: Bryan Reed), entitled "High Speed Photometric Stereo Pavement Scanner" demonstrates a photometric stereo camera technique for illuminating and capturing images of pavement surfaces to determine surface gradients and albedos. From said images, the system disclosed in Reed can discern the existence of cracks and furrows in the road for maintenance purposes. Reed also establishes that similar feature and elevation maps of roadways can be obtained using LIDAR based laser scanning.

The systems and methods mentioned above are not capable of localizing a vehicle on a road without relying on reflective markers and road signs or previous survey data. Laser or camera systems designed to identify cracks and road irregularities are not capable of recognizing surface elements at a level of detail required to assess the current position of a moving vehicle. Therefore, there exists a need for a means of localizing a vehicle by recognizing ground images using granular identification of micro-features in the road surface.

The following collects a definition of terms used to describe embodiments of the present invention:

Herein the term "registration" refers to the determination of the parameters and transformations (for example scaling, translation, rotation, geometric distortion, etc.) that will align one image with another, or will transform the images into a shared coordinate system.

Herein the term "image" refers to any two- or three-dimensional array of values collected by photographic or electronic means. Images can be monochrome or color and can be made from visible or non-visible reflected light, for example ultraviolet or infrared light. Generally, images capture the intensities, wavelength(s), and/or polarization of reflected light after the light has passed through an aperture and been focused by imaging optics.

Herein the term "localization" refers to the determination of an object's pose within a known coordinate system, where "pose" refers to the combination of both position and orientation of an object. An object's orientation can refer to the angle an object makes with respect to at least one axis, or its bearing or heading referenced to a compass direction or the positions of other objects. An object's position may be defined by latitude and longitude, its relation to the positions of landmarks or otherwise known, or fixed, positions, or any combination thereof. An object's position may be represented in two or three-dimensions. The concept of pose may also extend to images taken of the environment around an object. Each captured image may be associated with a position (the location of the subject of the image in a coordinate system) and an orientation (the angle, bearing, or heading of the imaging device with respect to the subject of the image).

Herein the term "mosaic" refers to an image or map that has been assembled from smaller constituents. For example, a mosaic image may be created from a two-dimensional array of smaller image tiles. Image tiles that form a mosaic may be overlapping, wherein portions of a plurality of tiles depict the same subject or feature, or be non-overlapping, wherein tiles depict distinct subjects, elements, or micro-features. A mosaic image comprising a plurality of image tiles may be composed pixel by pixel. A mosaic image may also be created as a composite of multiple images having some degree of overlap, but which cannot be directly composed pixel-by-pixel, e.g. because they image an object from different angles. Such a composite mosaic may be created, for example, by extracting a value at each desired output image location based on some function of the input images, which themselves may have been transformed to account for differences in perspective.

Herein the term "host" refers to an object whose pose is desired to be known, for example a vehicle traveling on a roadway. The term vehicle shall be hereby construed to refer to any one of a variety of transportation apparatuses that traverse over a road/road surface.

SUMMARY OF THE INVENTION

Accordingly, the present invention comprises a camera system mounted to a host, such as an autonomous vehicle, that detect patterns in reflected-light images of an environment to determine the host's pose. The camera system may then compare said patterns against a mosaic of previously collected images to localize the host.

A camera system for localizing a host may comprise an imaging device such as a digital stereo camera mounted to said host via a bracket and configured to obtain images of a road surface, an image processor, and a communications module in networked connection with said image processor, wherein the camera system is configured to identify micro-features in the road surface, analyze comparisons between micro-features in reference images and sample images, and to localize the host in three-dimensional space using said comparisons to calculate the host's pose. The imaging device may be mounted to the underside of the host and may be situated to the front, center, or rear of the host.

The camera system may be configured to identify micro-features in the road surface that exhibit lengths and widths less than 5 cm. Micro-features may be randomly distributed within the road surface and may comprise holes, pores, cracks, or granular materials in the road surface.

A method of localizing a host using a camera system in accordance with the present invention may comprise the following steps:

Step 1: Obtain at least one reference image of a road surface using said stereo camera.

Step 2: Determine the pose of each image using said image processor.

Step 3: Compile a plurality of reference images of the road surface into a reference mosaic using said image processor.

Step 4: Obtain at least one sample image of the road surface using said stereo camera.

Step 5: Determine the pose of each sample image using said image processor.

Step 6: Select a subset of the reference mosaic that corresponds to the pose of the sample image.

Step 7: Perform a registration step, wherein micro-features in the sample image and the selected subset of the reference mosaic are identified and compared using said image processor.

Step 8: Determine the pose of the host by matching identical micro-features identified in both the selected subset of the reference mosaic and the sample image. Matching identical micro-features in accordance with Step 8 may be performed by the image processor using an iterative method such as a random sample consensus.

The method of localizing a host may comprise an additional step of cleaning the road surface prior to Step 1.

The method of localizing a host may comprise an additional step of transmitting the pose of the host to a data repository or server using said communications module after Step 8.

BRIEF DESCRIPTION OF THE DRAWINGS

FIG. 1A displays the Front configuration, FIG. 1B displays the Rear configuration, and FIG. 1C displays the Center configuration, wherein the imaging device is situated under the rear, front, and center of the host vehicle, respectively.

DETAILED DESCRIPTION OF THE PREFERRED EMBODIMENTS

The camera system of the present invention may be mounted to a host vehicle 100 such as an overland vehicle.

Figure 1A:
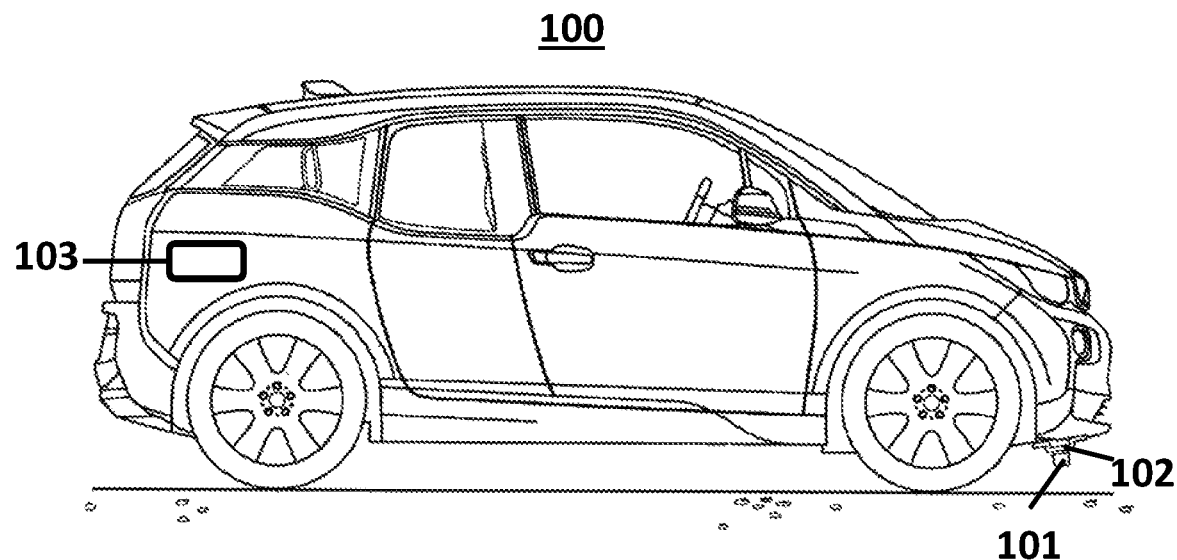
FIG. 1A, FIG. 1B, and FIG. 1C display three possible configurations for situating the imaging device of the camera system of the present invention on the underside of a host vehicle.
Figure 1B:
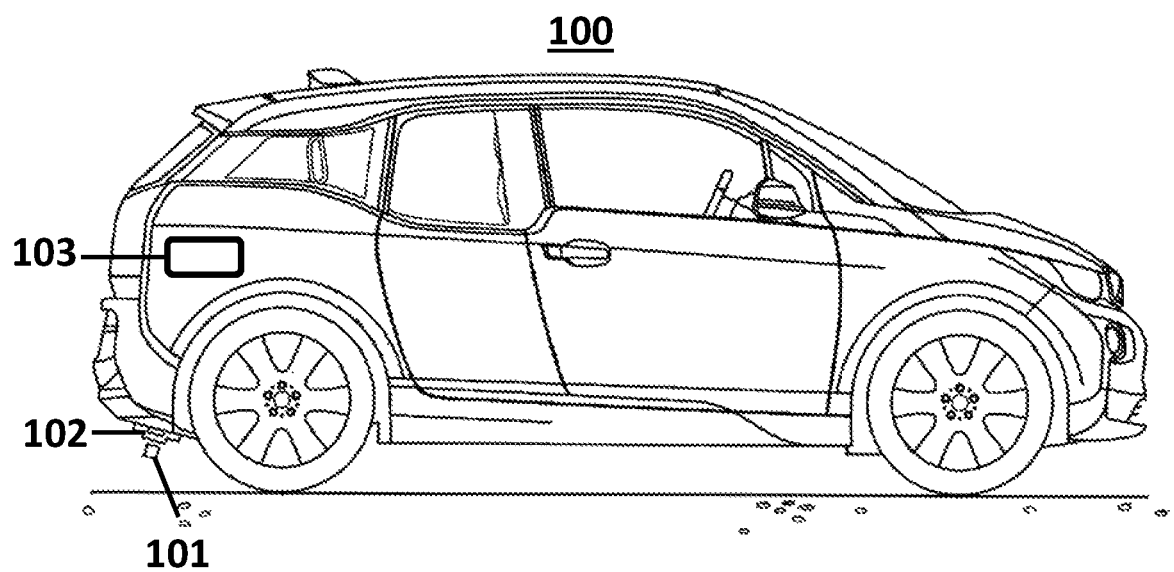
Figure 1C:
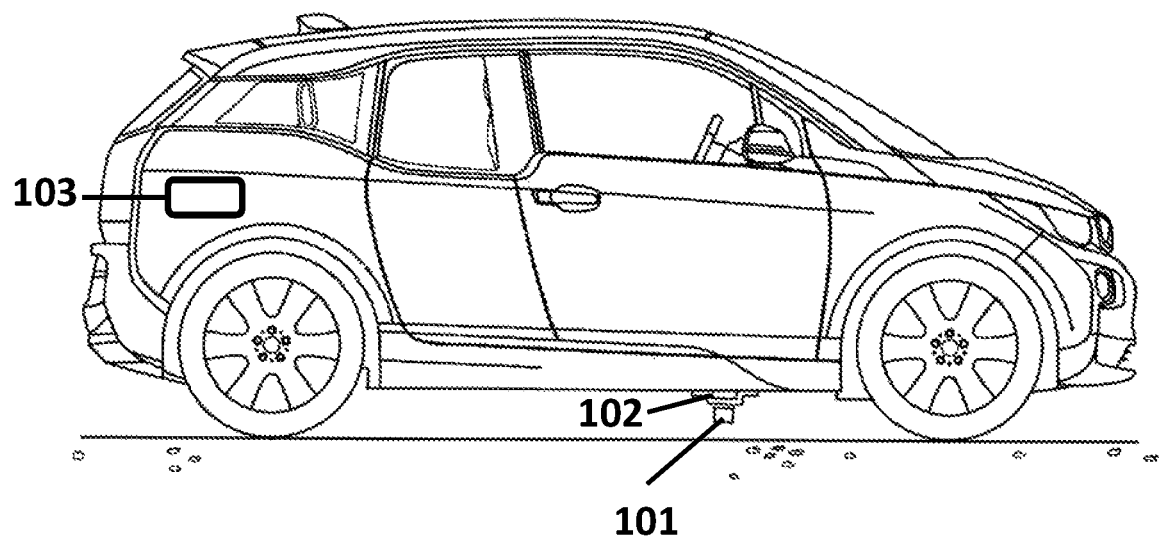

FIGS. 1A, 1B, and 1C depict examples of a suitable host vehicle, an automobile, to which a camera system of the present invention is mounted thereto. The camera system may be oriented to take images of the surface passed over by the host vehicle. An imaging device 101 may be situated beneath the host vehicle 100 and may be positioned to the front, center, or rear section of the host vehicle. The imaging device 101 may have a known orientation and position relative to the geometry of the host vehicle.

Said camera system may comprise at least one imaging device 101 attached to a bracket 102 that mounts the imaging device to the host 100, an image processor 103 in communicative connectivity with the imaging device (either by wires or wirelessly) and housed inside the host vehicle, and a communications module (not pictured) in communicative connectivity with the image processor. The imaging device may comprise at least one camera, wherein the camera may be a stereo camera having two or more lenses or another suitable digital camera configured to record three-dimensional images. The imaging device may comprise a plurality of cameras oriented in the same or different directions.

Images that are collected of a road surface by the camera system may capture the same scene or micro-features from different perspectives. This can occur, for example, if the host experiences a change in elevation or angle with respect to the road surface, such as during traversal over a speed bump, pothole, or surface discontinuity. The camera system may therefore be further configured with stereoscopic imagers having two or more lenses, the combination of which produces a three-dimensional image exhibiting the depth of binocular vision.

Figure 2:
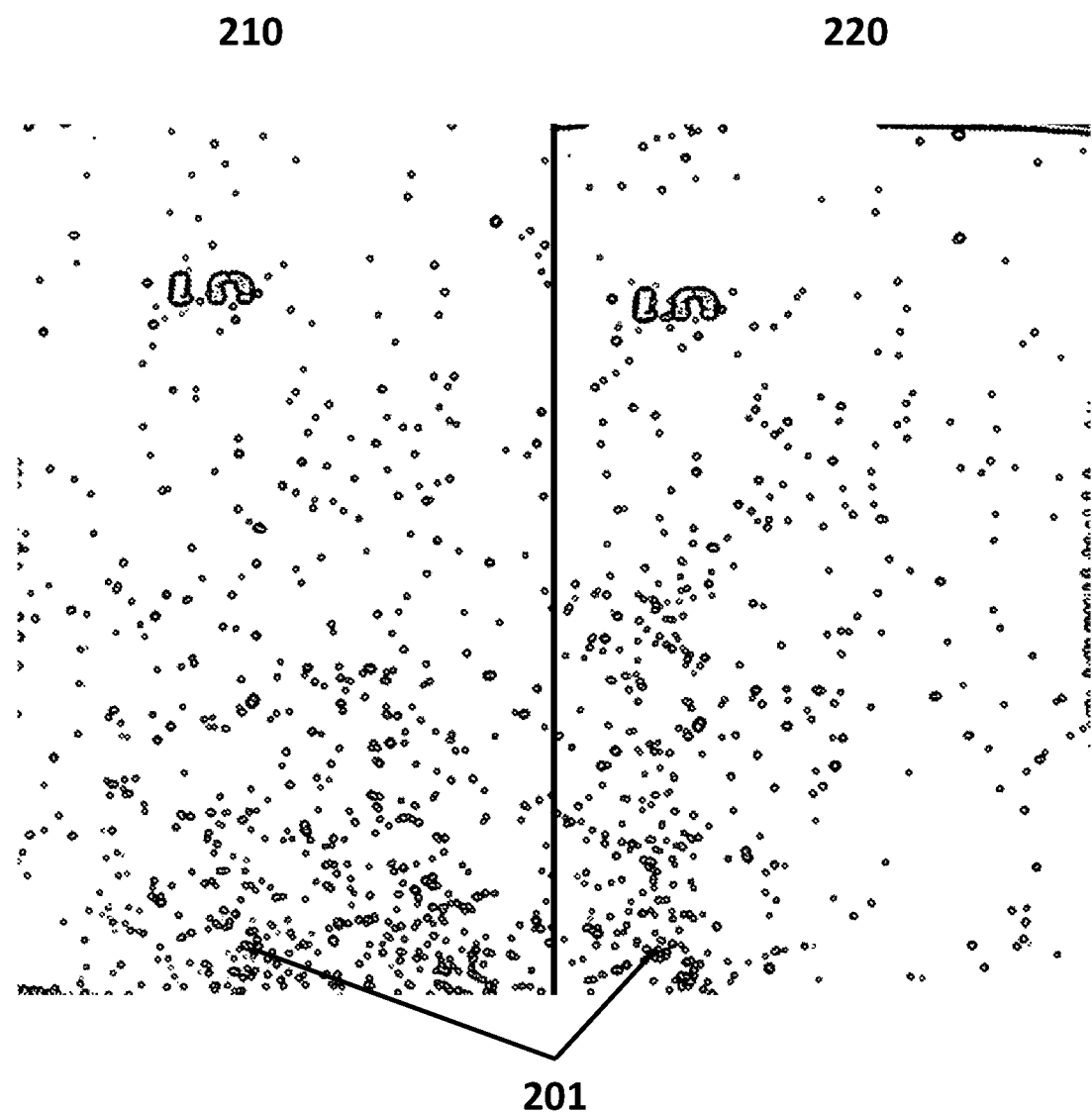
FIG. 2 displays side-by-side stereo camera images of micro-features discernible on a road surface by a camera system.

The camera system may be configured to consider two consecutive frames as "left" and "right" images of a stereoscopic pair and to formulate a stereoscopic image in accordance with an estimated baseline. FIG. 2 displays two adjacent image frames taken simultaneously of the same stretch of road surface (such as a street surface) by a stereo camera. In both the left image 210 and the right image 220, micro-features 201 on the road surface are visible. Asphalt and porous pavement roads exhibit numerous micro-features such as the contours of embedded pieces of granular material such as gravel, rocks, and other debris, as well as pores, cracks, holes, fissures, and geologic or geographic elements or deformations that may contribute to a road patch's unique signifier, or "road-print". The camera system of the present invention may be configured to detect a plurality of embedded materials and road surface irregularities within an image of a road surface at a scale of less than 5 cm. Detectable micro-features may have lengths and widths less than 5 cm in dimension.

In an embodiment of the invention, the host may comprise a vehicle traveling on a roadway, wherein one or more images of the surface of the roadway being traveled are collected by the camera system and are used to localize the vehicle in real-time. To determine the location of the host in three-dimensional space, the camera system may be configured to identify the micro-features and patterns in the road surface that comprise the surface's unique "road-print" and search for said identified micro-features in previously stored and analyzed images taken of road surfaces exhibiting identical GPS coordinates, hereafter known as reference images. Reference images may be collected of the road surface by said imaging device, processed by said image processor, and transmitted via said communications module to a data repository or server.

A method of localizing a vehicle equipped with the camera system of the present invention may comprise a first phase, during which reference images of a roadway are obtained, analyzed, composited, and stored, and a second phase, during which a vehicle traverses said same stretch of roadway and compares sample images to reference images obtained during initial traversals over the road surface.

Figure 3:
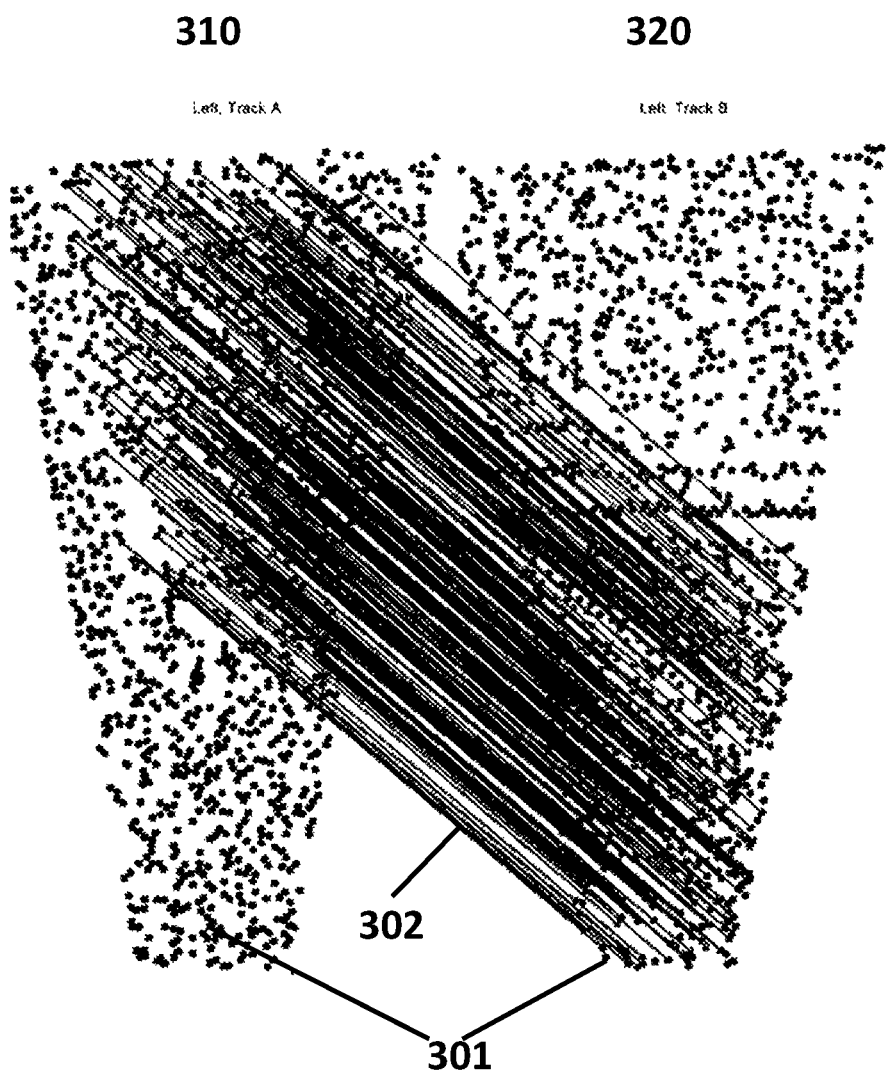
FIG. 3 displays the results of a probabilistic matching between microfeatures in a sample image taken by a camera system and a reference mosaic.

FIG. 3 displays two adjacent image frames taken subsequently of a proximately similar stretch of road surface. The left frame 310 displays a reference image, which may be part of a reference mosaic, taken previously of the ground surface comprising micro-features 301. The right frame displays a contemporaneous sample image, which may be part of a sample mosaic, taken of the ground surface. Identity lines 302 are drawn between the micro-features of the adjacent frames to indicate probabilistic matching between micro-features. Matching of micro-features between samples and references to a sufficient degree of certainty may localize the host by indicating its position in three-dimensional space and may be conducted in accordance with algorithmic methods outlined hereafter.

A method of localizing a host using a camera system in accordance with the present invention may comprise the following steps:

In a FIRST STEP, reference images may be obtained of the ground/road surface over which the vehicle will traverse during future operations. In a SECOND STEP, the pose (i.e. position and orientation) of each image may be determined by the image processor at the time the image is collected or later. The pose of each reference image(s) may be determined in relation to other reference image(s), other landmarks or locations, coordinates such as latitude and longitude, or elements on a map. Pose determination may be performed via a GPS method, in which GPS coordinates are measured in parallel to image collection and are associated with reference images, or a survey method, in which elements in the environment are surveyed with respect to a known location using, for example, a total station theodolite (a surveying instrument with a rotating telescope for measuring horizontal and vertical angles) to establish fixed reference coordinates. In a THIRD STEP, overlapping or non-overlapping reference images may be compiled by the image processor to form a composite mosaic image of the road surface. A composite of reference images is herein called a reference mosaic. Reference mosaics may be uploaded by the image processor via a communications module to a data repository or server for access and comparative purposes by other vehicle camera systems.

In a FOURTH STEP, the host vehicle may be driven over a road surface for which images have been previously obtained for reference. While transiting, the imaging device may collect one or more images (hereinafter referred to as sample images) of the surface of the roadway. In a FIFTH STEP, the pose of each image may be determined by the image processor at the time the image is collected. This may be done via said GPS method or said survey method or by some other means. In a SIXTH STEP, a subset of the reference mosaic may then be made available by the vehicle's image processor or by an external processor. The subset of the reference mosaic may be selected to narrow the possible present locations of the vehicle based on GPS or survey coordinates of the previously collected sample images; in this manner, the image processor may compare new sampled images to partial elements of the entire mosaic to accelerate the localization process.

In a SEVENTH STEP, the image processor may then perform a registration step, wherein the image processor conducts a search of the subset of the reference mosaic to determine where the sampled images are registered (i.e. are located) in the reference mosaic and to match micro-features in the sample image to micro-features in the reference image or reference mosaic. To determine a match between a sampled image and a portion of the reference mosaic, the image processor may perform an iterative method called Random Sample Consensus, or RANSAC. The random sample consensus may be performed by aligning, or fitting, a minimal number of the micro-features found in a sample image to micro-features in the reference mosaic, wherein said micro-features are randomly chosen from a set of observed micro-features. The minimal number of micro-features required for a RANSAC approach may be two or three. The image processor may then estimate the probability that a hypothesis for a match is correct by counting the number of other, non-selected, micro-features in the sample image which align with micro-features in the reference mosaic and may repeat these steps until a quality match is found. The quality of the match may be determined in accordance with predefined parameters, such as percentage of aligned micro-features, minimization of outliers, or other suitable methods. When the registration of the sampled image is determined, the pose of the sampled image with respect to the reference mosaic may be determined, and thereby, in an EIGHTH STEP, the pose of the host vehicle may also be determined.

Registration of sampled image(s) with respect to the reference mosaic may be performed either on the vehicle via the image processor or may be transmitted via a communication module to an image processor external to the vehicle. This latter method may be preferable if additional computational power is required than what is available from vehicle computer subsystems. Registration may be performed using suitable algorithmic methods of digital image correlation.

Registration of each sampled image in the reference mosaic of reference images may be performed by identifying micro-features found in both the sample image and the reference mosaic and then transforming each sampled image in relation to the reference mosaic until the best alignment of the micro-features in both images is achieved. Micro-features may be discerned as points, lines, and contours identified by measuring the intensity of light in the images, gradients (rates of change) in the intensity of light, inflection points in the rates of change of intensity of light, or other methods of identifying micro-features in images such as color or changes in color. Micro-features may also be identified by shape or curvature of patterns found in the image, or other suitable methods.

Registration of each sampled image in the mosaic of reference images may also, or alternatively, be performed by comparing intensity patterns between the two image sets using correlation metrics. For example, the image processor may be configured to perform phase correlations on the reference mosaic and the sampled images to estimate their offset using Fourier transforms. The image processor may be further configured to register the sampled images to the locations found in the reference mosaic using information output from said correlation metric methods.

The camera system may be configured to create high definition mosaics that stitch together multiple surface images into an image map of a roadway, and to identify the position of a host based on identifying micro-features and patterns in sampled images and registering them to a reference mosaic.

Micro-features in reflected light images may not always be discernible via natural light alone, especially when obscured in shadow or during the nighttime. Therefore, the camera system in accordance with the present invention may further comprise a lighting system to improve surface feature recognition and consistency of detection. The lighting system may comprise artificial light sources configured to illuminate the road surface during the capture of the reference image(s) that form the reference mosaic and subsequent sampled images. Said artificial light sources may include lasers or light-emitting bulbs or diodes; said light sources may be continuous, pulsed, flashed, or scanned. The artificial light sources can exhibit a wavelength or range of wavelengths that are visible to the human eye, or outside of the range of visibility to the human eye, such as infrared. The artificial light sources may further comprise optical filters configured to allow passage of light of desired wavelengths or intensities. The lighting system may be configured to adjust the intensity, filtering, or direction of light, or to actuate between ON and OFF modes, in response to information about present weather conditions, such as the presence of dew, fog, rain, or snow.

The search region for the registration of a sampled image during comparison with a reference mosaic may be further narrowed by measurement means. Narrowing the region of search for registration of the sampled image within the reference mosaic may speed the process of finding the registration of the sampled image in the mosaic. Measurement means for narrowing the field of search may include, but are not limited to odometers, GPS, inertial measurement units, or other methods that provide an estimate of the distance and direction traveled by the vehicle since its last known location or the location of its most previous registered sampled image.

As an illustrative example, a vehicle may be equipped with the camera system of the present invention, a GPS unit, and an odometer. At a first time $t_1$ the camera system may take a first image of the road surface. The image processor identifies micro-features and patterns in the image and performs a search over a subset of the reference mosaic. If a match is found, the vehicle can be localized at the position associated with the feature or pattern in the reference mosaic. At a subsequent time $t_2$, the camera system may take a second image of the road surface. The image processor identifies micro-features and patterns in the image and performs a search over a subset of the reference mosaic, wherein the subset is selected based on the measured distance traveled by the vehicle between $t_1$ and $t_2$ as interpolated by the difference in the odometer reading and the registered GPS coordinates. The subset of the reference mosaic may be selected to comprise an area that approximates the vehicles expected location after moving said measured distance, which has the benefit of reducing computational search time.

The spatial resolution of the reference and sampled image(s) collected by the imaging device may be approximately the same or different and may be at any level of resolution that enables the registration of one or more sampled images in the reference. The spatial resolution of each sampled image may be approximately the same or different as that of other sampled images and may be at any level of resolution that enables the registration of one or more sampled images in the reference mosaic. In a preferred embodiment, the spatial resolution of the reference mosaic and the sampled image(s) are approximately the same. Reference and/or sampled image(s) may be monochrome images of reflected light intensity, multiple color images, infrared images, or images of visible or non-visible reflected light.

In an alternative embodiment, a method of localizing an object using a camera system of the present invention may not require a first step of obtaining reference images of a road surface and forming a reference mosaic of the reference images. Instead, the camera system may be configured to localize the host in real time without reference to previously collected images or on a first traversal over a road surface. This may be accomplished by collecting a plurality of subsequent images of the road surface by the camera system, applying at least one rotation and/or transform to the plurality of images, and forming a mosaic of images of the road surface presently being traversed. The image processor may determine the pose of the host from the rotations and transforms, feedback from auxiliary sensors, information from GPS data, positions of landmarks, or any combination thereof.

A method of localizing an object using a camera system of the present invention may comprise an additional step of cleaning the road surface prior to image capture. Said cleaning step may be performed while the vehicle traverses over the road or in advance of the vehicle's traversal. The road surface may be cleaned by mechanical means or by a flow of fluid prior to the collection of either reference images, sampled images, or both. This cleaning step may be performed, for example, to remove debris, snow, or water from the road surface. The host may comprise a cleaning device for facilitating the cleaning step, or the camera system may be configured for self-cleaning, such as with wipers on the camera lens enclosures. The cleaning device may comprise a wiper, nozzle, brush, hose, or other suitable implement for removing debris, snow, or water from the road surface prior to image collection. The cleaning device may be configured to actuate in response to information about present weather conditions, such as the presence of dew, fog, rain, or snow.

In an alternative embodiment, the camera system of the present invention may be mounted to an autonomous vehicle and configured to determine the pose of the vehicle in real time as the vehicle traverses over a road. The autonomous vehicle may be configured to automatically adjust its navigation routing based on localization coordinates supplied by the camera system in tandem with data provided by ancillary proximity and environmental sensors. Images of the road surface may be collected by the camera system and analyzed by the image processor while the autonomous vehicle is moving and/or while it is stationary.

Various combinations and/or sub-combinations of the specific features and aspects of the above embodiments may be made and still fall within the scope of the invention. Accordingly, it should be understood that various features and aspects of the disclosed embodiments may be combined with or substituted for one another to form varying modes of the disclosed invention. Furthermore, it is intended that the scope of the present invention herein disclosed by way of examples should not be limited by the disclosed embodiments described above.

We claim:

1. A camera system for localizing a host, the camera system comprising:
    an imaging device configured to capture images of at least one road feature from at least two different perspectives and provide three dimensional imaging thereof, the imaging device mounted to said host and configured to obtain sample images of a road surface;
    an image processor: and
    a communications module in networked connection with said image processor;
    wherein the camera system is configured to:
        identify micro-features in the road surface, the micro-features comprising micro-features less than 5 cm in a first dimension, the micro-features comprising:
            contours of embedded pieces of granular material of the road surface,
            road surface pores,
            road surface cracks,
            road surface holes, and/or
            road surface fissures; and
        analyze comparisons between micro-features, comprising micro-features less than 5 cm in a first dimension, in reference images and the sample images; and
        localize the host in three-dimensional space using said comparisons between micro-features in reference images and the sample images.

2. The system of claim 1, wherein the micro-features are randomly distributed within the road surface.

3. The system of claim 2, wherein the micro-features comprise granular materials embedded in the road surface.

4. The system of claim 1, wherein the host is an autonomous vehicle.

5. The system of claim 1, wherein the imaging device is a digital stereo camera.

6. The system of claim 5, wherein the imaging device is mounted to an underside of the host.

7. The system of claim 5, wherein the imaging device is mounted to a front section of the host.

8. A method of localizing a host traversing a road surface, wherein the host is configured with a camera system mounted thereto, and wherein the camera system comprises a stereo camera oriented to view the road surface, an image processor, and a communications module, the method comprising:
    obtaining at least one reference image of a road surface using said stereo camera, said stereo camera configured to capture images of at least one road feature from at least two different perspectives and provide three dimensional imaging thereof;
    determining a pose of respective reference images using said image processor;
    compiling a plurality of reference images of the road surface into a reference mosaic using said image processor;
    obtaining at least a first sample image of the road surface using said stereo camera;
    determining a pose of the first sample image using said image processor;
    selecting a subset of the reference mosaic that corresponds to the pose of the first sample image;
    performing a registration, wherein micro-features in the first sample image and the selected subset of the reference mosaic are identified and compared using said image processor the micro-features comprising micro-features less than 5 cm in a first dimension, the micro-features comprising:
        contours of embedded pieces of granular material of the road surface,
        road surface pores,
        road surface cracks,
        road surface holes, and/or
        road surface fissures;

determining a pose of the host by matching corresponding microfeatures identified in both the selected subset of the reference mosaic and the first sample image using said image processor.

9. The method of claim 8, wherein matching corresponding microfeatures is performed by the image processor using an iterative method of random sample consensus.

10. The method of claim 8, wherein the micro-features are randomly distributed within the road surface.

11. The method of claim 8, wherein the micro-features comprise granular materials embedded in the road surface.

12. The method of claim 8, wherein the method comprises cleaning the road surface prior to obtaining at least one reference image of the road surface using said stereo camera.

13. The method of claim 8, the method further comprising transmitting a pose of the host to a data repository or server using said communications module.

14. A camera system for localizing a host vehicle, the camera system comprising:
- an imaging device configured to capture images of at least one road feature from at least two different perspectives and provide three dimensional imaging thereof, the imaging device mounted to said host vehicle, wherein the imaging device is faces downward to obtain sample images of a road surface;
- an image processor;
- database of reference images of the road surface, wherein a given reference image is associated with a known location; and
- a communications module in networked connection with said image processor and database;
- wherein the camera system is configured to identify micro-features in the road surface from the sample images, match the micro-features identified in the sample images with micro-features in the reference images of the road surface, and localize the host vehicle in space based on the known location associated with one or more reference images that match the sample images, wherein the micro-features comprise micro-features less than 5 cm in a first dimension, the micro-features comprising:
- contours of embedded pieces of granular material of the road surface,
- road surface pores,
- road surface cracks,
- road surface holes, and/or
- road surface fissures.

* * * * *